C. M. & C. E. KEMP.
PIPE TESTING PLUG.
APPLICATION FILED MAY 20, 1911.
1,077,352.
Patented Nov. 4, 1913.
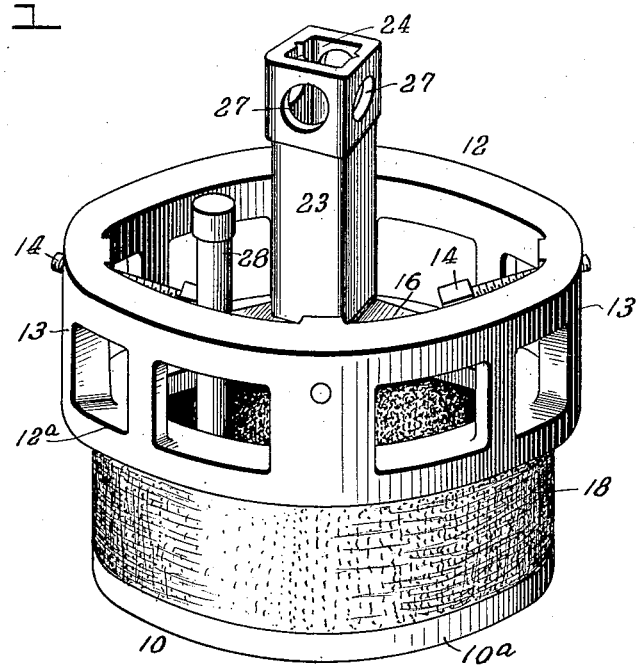
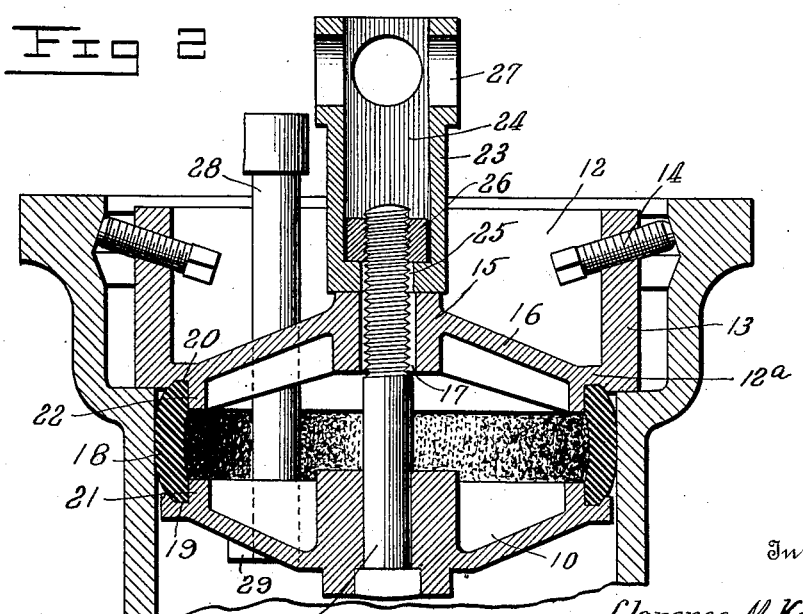
Witnesses
Inventors
Clarence M. Kemp
Charles E. Kemp
By Meyers, Cushman & Rea
Attorney

UNITED STATES PATENT OFFICE.

CLARENCE M. KEMP AND CHARLES E. KEMP, OF BALTIMORE, MARYLAND, ASSIGNORS TO C. M. KEMP MANUFACTURING CO., OF BALTIMORE, MARYLAND, A CORPORATION OF MARYLAND.

PIPE-TESTING PLUG.

1,077,352.

Specification of Letters Patent.

Patented Nov. 4, 1913.

Application filed May 20, 1911. Serial No. 628,596.

*To all whom it may concern:*

Be it known that we, CLARENCE M. KEMP and CHARLES E. KEMP, citizens of the United States, residing at Baltimore, in the State of Maryland, have invented new and useful Improvements in Pipe-Testing Plugs, of which the following is a specification.

This invention relates to pipe testing plugs for temporarily closing the open ends of pipes and pipe lines so that fluid under pressure, preferably water, may be forced into said pipes or pipe lines to test the tightness of the joints and connections for the purpose of ascertaining the perfection of the work.

To this end, the invention comprises a sleeve of slightly less diameter than the pipe to be tested, made of some resilient material, such as rubber, held endwise between two compression heads, one of which heads and the sleeve are placed within the bore of the pipe while the other and larger outer head enters only the bell of the pipe and rests against the shouldered bottom thereof. Suitable means, such as a screw, is employed to draw the heads together and compress the sleeve endwise, thus forcing its perimetrical surface tightly against the inner wall of the pipe to form a fluid tight closure for said pipe and to retain the plug in place. Additional retaining means may be and preferably are employed to hold the plug in place when excessive test pressure is necessary, such as bolts which are threaded in the outer compression head and bear against the inner wall of the bell. A relatively small pipe passes through the plug for the attachment of the fluid compressing apparatus.

In the accompanying drawings, Figure 1 is a perspective view of one form of the improved testing plug. Fig. 2 is a central sectional view of the same in position in the end of a pipe.

Similar reference characters are used for the same parts in all the figures.

Referring to Figs. 1 and 2, the numeral 10 designates the inner compression head comprising a circular plate 10ª of slightly less diameter than the bore of the pipe to be tested, which plate may be flat, or bulged in the direction of pressure when made for large pipes or when heavy test pressure is employed. Rigidly fastened in the center of the head 10 is an outwardly projecting stem 11 of suitable length, threaded on its outer end as shown.

The outer compression head 12 is of greater diameter than the inner head 10 and comprises an annulus 12ª around the periphery of which is formed a wide cylindrical flange 13 extending beyond said annulus, preferably for some distance, and through which in radial planes near its outer edge are threaded a plurality of screw bolts 14. These bolts may be threaded in or pass through the flange 13 perpendicular thereto, but are preferably inclined outwardly as shown. A collar 15 forms the center of the compression head 12 and is connected to the annulus 12ª by a plurality of arms 16, said collar having its axial opening 17 sufficiently large to permit the stem 11 passing freely through it.

Between the compression heads 10 and 12 is placed a ring, sleeve or cylindrical band 18 of resilient material, as rubber, the edges of which are seated in grooves 19, 20 formed respectively in the adjacent faces of the inner and outer compression heads close to their outer edges. Flanges 21 and 22 project respectively from the heads 10 and 12 within the sleeve or band 18 for a suitable distance to form a support for and prevent the edges of said sleeve collapsing or yielding inwardly when pressure is applied thereto.

The numeral 23 designates a tightening member for drawing the compression heads together, preferably square or of other polygonal shape in cross section and made with a deep pocket 24 of like shape extending downwardly from its open outer end. The bottom of the tightening member 23 has an opening 25 through which the stem projects into said pocket. At the bottom of the pocket 24 is a nut 26 dropped thereinto from the open end of said pocket and rotatable with the member 23, the sides of said nut and pocket coinciding to permit this. Lateral openings 27 are made in the outer end of the tightening member 23 into which a bar, rod, tool or other object may be inserted for rotating said member. A small pipe 28 is screwed into a threaded hole in the compression head 12 or in a boss 29 formed thereon and extends outwardly beyond the flange 13 to connect with a fluid pressure apparatus.

In use, the plug is inserted in the bell end of a pipe until the larger outer compression head abuts against the shoulder at the bottom of the bell, the inner compression head 10 and resilient sleeve 18 passing into the bore of the pipe, being but slightly less in diameter than said bore. The tightening member 23, previously unscrewed to relieve the sleeve from pressure, is now rotated to draw the stem 11 and the inner head toward the outer head. This movement of the outer head compresses the sleeve 18 endwise causing it to bulge outwardly against the inside of the pipe. The rotation of the tightening member is continued until sufficient pressure has been brought to bear on the sleeve to produce a fluid tight closure between the plug and the pipe and frictional resistance sufficient to overcome the pressure of the test fluid within the pipe or pipe line. When testing under pressure too great for the sleeve to hold the plug in place, the bolts 14 can be screwed tightly against the sides of the bell and reinforce the holding action of the sleeve. A wrench may be applied to the tightening member for rotating it, but a bar or tool of some sort inserted in the openings 27 is preferable.

What we claim is:

A testing plug for pipes comprising a pair of compression heads of different diameters, one of which is adapted to enter the bore of a pipe and the other to remain outside the same, a resilient packing sleeve between said heads, a threaded stem fixed in the inner head and projecting freely through an opening in the outer head, an elongated tightening member adapted to project beyond the end of the pipe when the plug is applied for rotating the same, through which member said stem freely passes, a deep pocket of polygonal cross-section in the outer end of said member, and a polygonal nut threaded on said stem longitudinally slidable within said pocket but rotatable with said member when the latter is turned for drawing the heads together.

In testimony whereof we have hereunto set our hands in presence of two subscribing witnesses.

CLARENCE M. KEMP.
CHARLES E. KEMP.

Witnesses:
FELIX R. SULLIVAN,
F. HERBERT PREM.

---

Copies of this patent may be obtained for five cents each, by addressing the "Commissioner of Patents, Washington, D. C."